Patented Aug. 9, 1927.

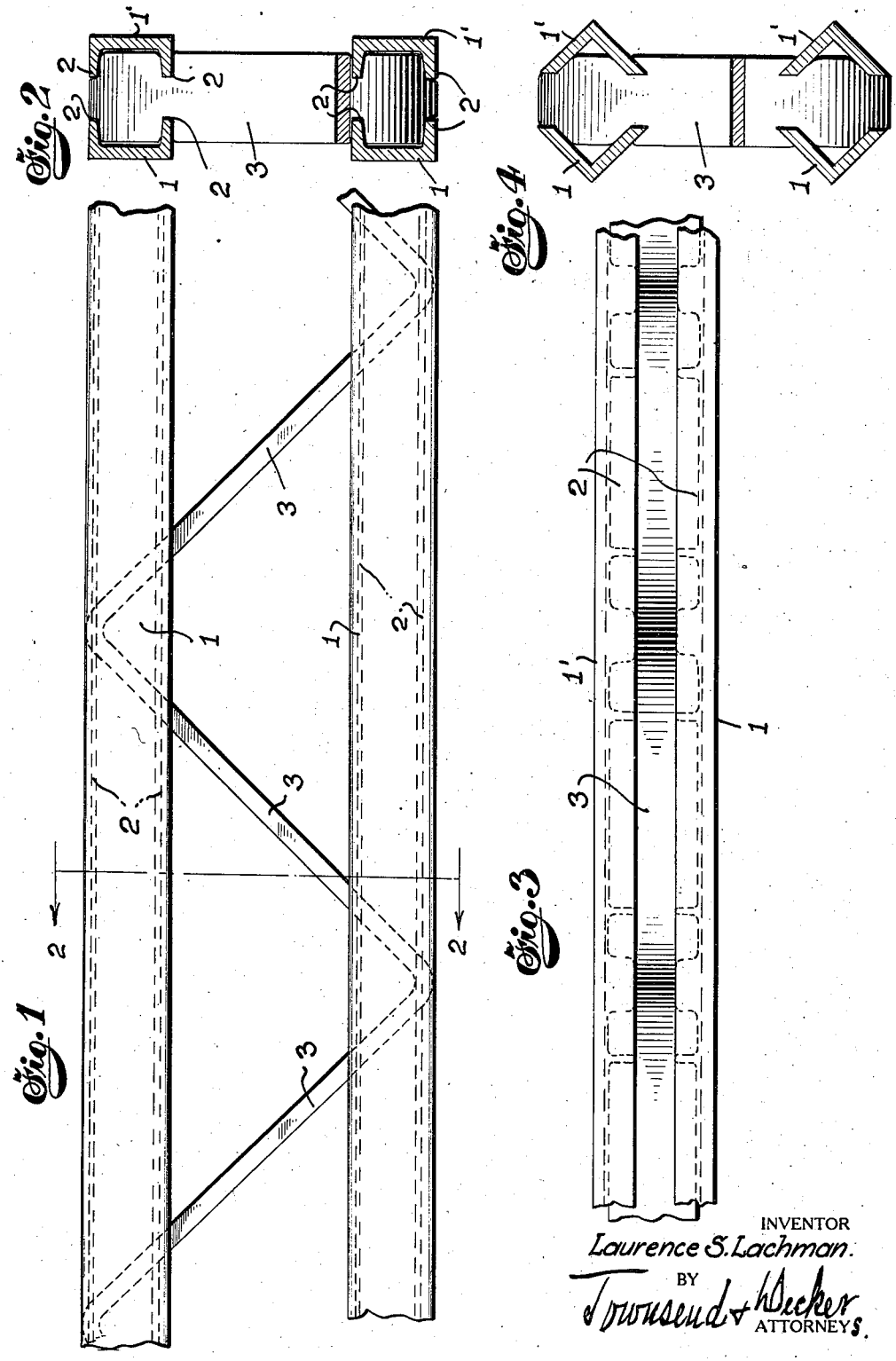

1,638,637

UNITED STATES PATENT OFFICE.

LAURENCE S. LACHMAN, OF NEW YORK, N. Y., ASSIGNOR TO UNIVERSAL ELECTRIC WELDING COMPANY, A CORPORATION OF NEW YORK.

GIRDER.

Application filed November 9, 1923, Serial No. 673,660. Renewed May 5, 1927.

My invention relates to girders, beams or the like comprising upper and lower or longitudinal members joined by braces or struts to form a skeleton girder in contradistinction to a plate girder.

The invention relates more particularly to a skeleton girder in which the braces or struts are electrically welded to the upper and lower members or longitudinals and its object is to produce a girder or the like which will have great resistance to force tending to deform it either in the plane of the girder or in the direction transverse thereto and that at the same time will be cheap to construct by reason of the small amount of material contained therein and the facility with which the parts may be joined by the electric welding method.

To these ends my invention consists in the special construction hereinafter described in connection with the accompanying drawings and then specified in the claims.

While the invention is described in connection with the production of a structure termed for convenience a girder, it will be understood that the purposes and advantages of the invention may be realized in any similar structure employed for any other purpose and that therefore, the term girder is employed merely for convenience of description.

In the accompanying drawings:

Fig. 1 is a side elevation of a girder embodying my invention.

Fig. 2 is a vertical cross-section through Fig. 1 on the line 2—2.

Fig. 3 is a plan of the girder.

Fig. 4 shows in cross-section a modification of the form of bar or strip employed according to my invention as one of a pair of bars constituting the upper or lower member.

Each upper and lower member or longitudinal of the structure consists of a pair of bars 1 and 1'. These are arranged in parallel relation and in close proximity to one another and on edge or in other words the general plane of each bar is substantially parallel to the general plane of the girder. Each of the plates or bars forming a longitudinal is provided with an interiorly projecting longitudinal edge or projection to aid in the welding of the spacing plate or plates to said bars 1, 1' in position between them. Said edge or projection is afforded by the longitudinal flanges or ribs 2 of the bar constituting a commercial form of bar known as a channel bar, the said channel bars being arranged so that the two flanges of the two bars constituting the pair of bars making up the longitudinal member will project towards one another.

A strut or brace connecting the upper and lower members thus formed of a pair of bars on edge consists of a plate disposed in a plane transverse to the general plane of the structure and interposed between and spacing the bars apart and welded thereto on the edges of said plate. This plate indicated at 3 is preferably constructed by bending said plate into the zig-zag shape to form diagonals, the bends of the zig-zag being located between the bars or plates 1, 1' in position flush or within the horizontal plane taking in the outer edges of the two bars 1, 1'.

In the welding of the edges of the plate 3 to the inner sides of the bars 1, 1' the longitudinal flanges 2, where engaged by the edge of the plate 3, afford limited areas of contact useful in producing heated areas for welding when the parts are assembled in position between pressure and current supplying dies as well understood in the art of resistance and pressure welding.

The pressure may be applied in such degree and for such time, if desired, as to partially force the edge flanges 2 into the edge of the plate 3, the union at this point forming a homogeneous welded joint. In some cases, however, depending generally upon the depth of the flange, the edges of the plate 3 at the unwelded part are not brought into engagement with the flat or web part of the flanged bar.

It will be seen from the foregoing that great stiffness or resistance to compression load applied in the general plane of the girder or the like is secured by reason of the fact that the two plates 1, 1' are disposed on edge, and that great resistance to distortion forces or those tending to deform the girder in a direction transverse to its general plane is secured by reason of the fact that the plane of the plate 3 is transverse to the general plane of the girder and that resistance to further deforming action is enhanced by the disposition of the longitudinal flanges of the flanged bar extending toward one another in a general direction transverse to the general plane of the girder.

It will also be seen that in use as a girder the structure possesses the advantage that the faces thereof are free from objectionable projections and that by locating the bends flush with or below the general plane of the external edges of each pair of bars 1, 1', the edges of the girder will be free from projections or obstructions which is a further advantage in many conditions of use.

Instead of the flanged metal bar described commercially as a channel bar the form of bar known as angle bar illustrated in Fig. 4 may be employed and disposed in the same general manner as in the case already described, the two longitudinal flanges or angles of said bar affording at their edges the longitudinal projections when the bars are disposed with the interior angles facing one another for welding said bars to the edges of the plate 3.

As will be seen, in the preferred form of my invention illustrated in Figs. 1, 2 and 3, channel bars are so disposed that a broad, flat supporting surface is afforded at the top of the girder for the support of flooring or other element of a structure.

I do not limit myself to the use of the structure described as a girder, although for convenience of description the term girder is used in this specification and in the claims, inasmuch as said structure may be employed to advantage in other situations or for other uses without departing from the purposes and advantages of my invention.

What I claim as my invention is:—

1. An electrically welded skeleton, girder, beam or the like the upper and lower members of which consist each of a pair of metal bars arranged parallel to one another each provided with a flange projecting toward one another, the general plane of each bar being substantially parallel to the general plane of the girder, and a zigzag member defining braces or struts and consisting of a plate disposed at all points in planes transverse to the general plane of the structure and interposed between and spacing the pairs of bars apart, the bends thereof electrically welded to the bars and contacting with the inner surfaces of the flanges and supported thereby.

2. An electrically welded skeleton girder, beam or the like the upper and lower members of which consist each of a pair of channel bars arranged on edge parallel and in close proximity to one another, the general plane of each being substantially parallel to the general plane of the girder while the flanges are projected toward one another to afford longitudinal welding edges and a zigzag member defining braces or struts and consisting of a plate disposed at all points in planes transverse to the general plane of the structure and interposed between and spacing the said pairs of channel bars apart, and the bends thereof contacting with the inner surfaces of the outer flanges and supported thereby and the edges contacting with the edges of the inner flanges and electrically welded thereto.

Signed at New York, in the county of New York and State of New York, this 8th day of November, A. D. 1923.

LAURENCE S. LACHMAN.